US012772043B2

(12) United States Patent
Guo et al.

(10) Patent No.: US 12,772,043 B2
(45) Date of Patent: Oct. 20, 2026

(54) METHOD FOR REPORTING CAPABILITY INFORMATION, AND COMMUNICATION DEVICE AND STORAGE MEDIUM

(71) Applicant: Beijing Xiaomi Mobile Software Co., Ltd., Beijing (CN)

(72) Inventors: Shengxiang Guo, Beijing (CN); Yumin Wu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 272 days.

(21) Appl. No.: 18/700,482

(22) PCT Filed: Oct. 13, 2021

(86) PCT No.: PCT/CN2021/123634
§ 371 (c)(1),
(2) Date: Apr. 11, 2024

(87) PCT Pub. No.: WO2023/060490
PCT Pub. Date: Apr. 20, 2023

(65) Prior Publication Data
US 2025/0023613 A1 Jan. 16, 2025

(51) Int. Cl.
*H04B 7/06* (2006.01)
*H04W 8/22* (2009.01)
(Continued)

(52) U.S. Cl.
CPC ............ *H04W 8/22* (2013.01); *H04B 7/0628* (2013.01); *H04B 7/06952* (2023.05);
(Continued)

(58) Field of Classification Search
CPC .. H04B 7/02–12; H04B 17/0082–3913; H04L 5/0001–0098; H04W 8/22–245;
(Continued)

(56) References Cited

U.S. PATENT DOCUMENTS

2020/0404638 A1 12/2020 Deogun et al.
2021/0274438 A1 9/2021 Guan
2023/0336974 A1* 10/2023 Xing ...................... H04W 8/24

FOREIGN PATENT DOCUMENTS

CN 113472506 A 10/2021
WO 2020198713 A1 10/2020
(Continued)

OTHER PUBLICATIONS

ZTE Corporation, "Further discussion on CBM & IBM for FR2 Inter-band DL CA", 3GPP TSG-RAN WG4 Meeting#99-e, Electronic Meeting, May 19-May 27, 2021 (Year: 2021).*
(Continued)

*Primary Examiner* — Timothy J Weidner
(74) *Attorney, Agent, or Firm* — Volpe Koenig

(57) ABSTRACT

A method for reporting beam management capability information. The method is performed by a terminal, and the method includes: reporting the beam management capability information, where the beam management capability information is at least configured to indicate that the terminal supports beam management modes of independent beam management (IBM) and common beam management (CBM).

14 Claims, 7 Drawing Sheets

(51) Int. Cl.

| | |
|---|---|
| ***H04W 72/044*** | (2023.01) |
| ***H04W 72/0453*** | (2023.01) |
| ***H04W 72/21*** | (2023.01) |
| ***H04W 84/02*** | (2009.01) |
| ***H04W 88/02*** | (2009.01) |
| ***H04W 88/08*** | (2009.01) |
| ***H04W 92/02*** | (2009.01) |
| ***H04W 92/10*** | (2009.01) |

(52) U.S. Cl.
CPC ..... *H04W 72/0453* (2013.01); *H04W 72/046* (2013.01); *H04W 72/21* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ........... H04W 24/02–10; H04W 36/0005–385; H04W 72/02–569; H04W 84/02–16; H04W 88/02–12; H04W 92/02–04; H04W 92/10
See application file for complete search history.

(56) References Cited

FOREIGN PATENT DOCUMENTS

| | | | |
|---|---|---|---|
| WO | 2021144114 | A1 | 7/2021 |
| WO | 2021196134 | A1 | 10/2021 |

OTHER PUBLICATIONS

Huawei, HiSilicon, "Discussion on NCSG", 3GPP TSG-RAN WG4 Meeting #100-e,R4-2114307, Electronic Meeting, Aug. 16-27, 2021.
Sony, Ericsson, "Inter-band DL CA in FR2: CBM/IBM capability and associated spherical coverage EIS tests", 3GPP TSG-RAN WG4 Meeting # 95-e, R4-2006320, Electronic Meeting, May 25-Jun. 5, 2020.
ZTE Corporation, "Discussion on CBM & IBM for FR2 Inter-band DL CA", 3GPP TSG-RAN WG4 Meeting # 98-bis-e, R4-2106364, Electronic Meeting, Apr. 12-20, 2021.
ZTE Corporation, "Further discussion on CBM & IBM for FR2 Inter-band DL CA", 3GPP TSG-RAN WG4 Meeting#99-e, Electronic Meeting, May 19-May 27, 2021.

* cited by examiner

METHOD FOR REPORTING CAPABILITY INFORMATION, AND COMMUNICATION DEVICE AND STORAGE MEDIUM

CROSS REFERENCE TO RELATED APPLICATION

The present application is a U.S. National Stage of International Application No. PCT/CN2021/123634, filed on Oct. 13, 2021, the contents of all of which are incorporated herein by reference in their entirety for all purposes.

BACKGROUND OF THE INVENTION

As mobile communication technology develops, wireless communication technology has a growing tendency towards high-frequency technology, large-bandwidth technology, massive multiple-input multiple-output technology, and multi-carrier aggregation technology in order to satisfy the requirement of a higher network transmission rate.

In the massive multiple-input multiple-output technology and the multi-carrier aggregation technology, beam management is required based on the different capabilities of terminals.

SUMMARY OF THE INVENTION

According to a first aspect of examples of the disclosure, a method for reporting beam management capability information is provided. The method is performed by a terminal, and includes: reporting the beam management capability information, where the beam management capability information is at least configured to indicate that the terminal supports beam management modes including at least one of independent beam management (IBM) or common beam management (CBM).

According to a second aspect of an example of the disclosure, a method for reporting beam management capability information is provided. The method is performed by a base station, and includes: receiving the beam management capability information, where the beam management capability information is at least configured to indicate that a terminal supports beam management modes including at least one of IBM or CBM.

According to a third aspect of an example of the disclosure, a communication device is provided. The communication device includes: a processor; and a memory configured to store a processor-executable instruction, where the processor is configured to implement the method of any example of the disclosure when running the executable instruction.

According to a fourth aspect of an example of the disclosure, a non-transitory computer-readable storage medium is provided. The non-transitory computer-readable storage medium stores a computer-executable program, where the executable program implements the method of any example of the disclosure when executed by a processor.

DETAILED DESCRIPTION OF THE INVENTION

The examples will be described in detail here and are illustratively shown in the accompanying drawings. When the following descriptions relate to the accompanying drawings, unless otherwise specified, the same numeral in different accompanying drawings denotes the same or similar element. The embodiments described in the following examples do not denote all embodiments consistent with the examples of the disclosure. On the contrary, the embodiments are merely examples of an apparatus and a method consistent with some aspects of the examples of the disclosure as detailed in the appended claims.

The terms used in the examples of the disclosure are merely to describe the specific examples, instead of limiting the examples of the disclosure. The singular forms such as "a" and "the" used in the examples of the disclosure and the appended claims are also intended to include the plural forms, unless otherwise clearly stated in the context. It should further be understood that the term "and/or" used here refers to and includes any of one or more of the associated listed items or all possible combinations.

It should be understood that although the terms of first, second, third, etc. can be used in the examples of the disclosure to describe various types of information, this information should not be limited to these terms. These terms are merely used to distinguish the same type of information from each other. For example, without departing from the scope of the examples of the disclosure, the first information can also be referred to as second information, and similarly, the second information can also be referred to as the first information. Depending on the context, the word "if" as used here can be interpreted as "at the time of" or "when" or "in response to determining".

For the sake of brevity and ease of understanding, the terms "greater than" or "less than" are used here to characterize size relations. However, for those skilled in the art, it can be understood that the term "greater than" also covers the meaning of "greater than or equal to", and "less than" also covers the meaning of "less than or equal to".

The disclosure relates to, but is not limited to, the technical field of wireless communication, and in particular to a method and apparatus for reporting beam management capability information, a communication device, and a storage medium.

In a multi-carrier system in a millimeter wave band, intra-band carrier aggregation and inter-band carrier aggregation are generally involved. For the intra-band carrier aggregation, multiple carriers share a radio frequency channel. Consequently, a terminal merely supports common beam management (CBM). For the inter-band carrier aggregation, a terminal is likely to support the CBM or independent beam management (IBM) between two or more bands, while a capable terminal is likely to support both the IBM and the CBM.

Figure 1:
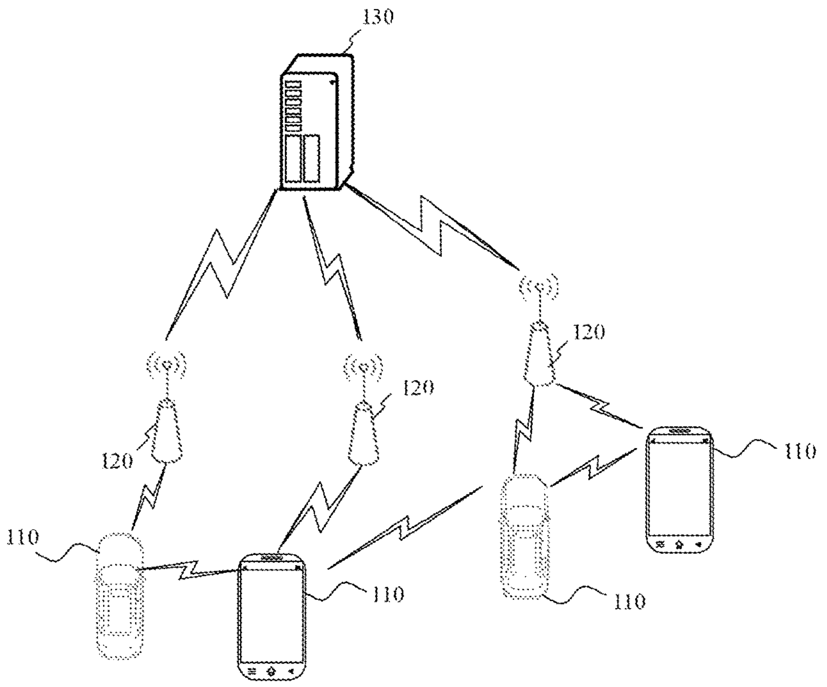
FIG. 1 is a schematic structural diagram of a wireless communication system according to an example.

FIG. 1 is a schematic structural diagram of a wireless communication system according to an example of the disclosure. As shown in FIG. 1, the wireless communication system is a communication system based on a mobile communication technology, and may include a plurality of user equipment 110 and several base stations 120.

The user equipment 110 may be a device that provides voice and/or data connectivity for a user. The user equipment 110 may communicate with one or more core networks via a radio access network (RAN). The user equipment 110 may be an Internet of Things user equipment, such as a sensor device, a mobile phone, or a computer having an Internet of Things user equipment. For example, the user equipment may be a fixed, portable, pocket, hand-held, computer built-in, or vehicle-mounted apparatus, for example, a station (STA), a subscriber unit, a subscriber station, a mobile station, a mobile, a remote station, an access point, a remote terminal, an access terminal, a user terminal, a user agent, a user device or a user equipment. Alternatively, the user equipment 110 may also be a device of an unmanned aerial vehicle. Alternatively, the user equipment 110 may also be a vehicle-mounted device, for example, an electronic control unit having a wireless communication function, or a wireless user equipment externally connected to the electronic control unit. Alternatively, the user equipment 110 may also be a roadside device, for example, a street lamp, signal lamp or other roadside devices having a wireless communication function.

The base station 120 may be a network-side device in the wireless communication system. The wireless communication system may be a fourth generation mobile communication (4G) system, and is also known as a long term evolution (LTE) system. Or, the wireless communication system may also be a fifth generation mobile communication (5G) system, and also known as a new radio (NR) system or a 5G NR system. Alternatively, the wireless communication system may also be a next-generation system after a 5G system. An access network in the 5G system may be referred to as a new generation-radio access network (NG-RAN).

The base station 120 may be an evolved node B (eNB) used in a 4G system. Alternatively, the base station 120 may also be a g node B (gNB) using a centralized distributed architecture in the 5G system. When the base station 120 uses the centralized distributed architecture, the base station usually includes a central unit (CU) and at least two distributed units (DUs). Protocol stacks of a packet data convergence protocol (PDCP) layer, a radio link control (RLC) layer, and a media access control (MAC) layer are arranged in the CU; and a protocol stack of a physical (PHY) layer is arranged in the DU. The specific implementation form of the base station 120 is not limited to the example of the disclosure.

A wireless connection may be established between the base station 120 and the user equipment 110 by means of a radio air interface. In different embodiments, the radio air interface is a radio air interface based on a 4G standard; or, the radio air interface is a radio air interface based on a 5G standard, for example, the radio air interface is a NR; or, the radio air interface may also be a radio air interface based on a next-generation mobile communication network technology standard after 5G.

In some examples, an end-to-end (E2E) connection may further be established between one or multiple pieces of user equipment 110, such as vehicle-to-vehicle (V2V) communication, vehicle-to-infrastructure (V2I) communication, and vehicle-to-pedestrian (V2P) communication in vehicle-to-everything (V2X) communication.

Here, the user equipment described may be considered as a terminal device of the following examples.

In some examples, the wireless communication system described may further include a network management device 130.

The several base stations 120 are each connected to the network management device 130. The network management device 130 may be a core network device in the wireless communication system. For example, the network management device 130 may be a mobility management entity (MME) in an evolved packet core (EPC). Alternatively, the network management device may also be another core network device, such as a serving gateway (SGW), a public data network gateway (PGW), a policy and charging rules function (PCRF), and a home subscriber server (HSS). The implementation form of the network management device 130 is not limited in the example of the disclosure.

In order to facilitate understanding by those skilled in the art, a plurality of embodiments are listed in the example of the disclosure to clearly describe the technical solution of the example of the disclosure. Certainly, those skilled in the art can understand that the plurality of examples according to the example of the disclosure can be executed separately, or may also be executed together in combination with the methods of other examples in the example of the disclosure, or may further be executed together with some methods of other related art separately or in combination, which is not limited in the example of the disclosure.

In order to better understand the technical solution disclosed in the example of the disclosure, a reporting mode of a beam management mode will be described by means of an illustrative application scenario.

In an example, a beam management mode supported by a terminal may be reported by means of the following information elements (IEs):

```
RF-Parameters ::= SEQUENCE {
[[
  supportedBandCombinationList-v1630      BandCombination-
                                          List-v1630
OPTIONAL,
      ]],
}
```

/Here, supportedBandCombinationList-v1630 is a supported band combination list signaling; and BandCombinationList-v1630 is a band combination list signaling/

-continued

```
BandCombinationList-v1630 ::= SEQUENCE (SIZE (1..maxBand-
Comb)) OF BandCombination-v1630
/Here, BandCombinationList-v1630 is a band combination list
signaling/
BandCombination-v1630 ::= SEQUENCE {
  ca-ParametersNR-v1630 CA-ParametersNR-v1630 OPTIONAL,
}
/Here, CA-ParametersNR-v1630 is a new radio (NR) carrier aggre-
gation (CA) parameter signaling/
CA-ParametersNR-v1630 ::= SEQUENCE { -- R4 8-5: supported
beam management type for inter-band CA
  beamManagementType-r16 ENUMERATED {ibm, cbm}
OPTIONAL,
}.
/Here, CA-ParametersNR-v1630 is a NR CA parameter signaling;
and beamManagementType-r16 is a beam management type
signaling/.
```

In an example, a terminal may support beam management modes of both CBM and IBM, and how to configure the beam management modes depends on network scheduling. However, the IBM or the CBM supported by the terminal may merely be reported and both the IBM and the CBM supported by the terminal may not be reported by means of the IE beamManagementType-r16. Moreover, the IE beamManagementType-r16 does not reserve corresponding extension bits. Thus, the network cannot configure the corresponding beam management mode for the terminal according to scheduling requirements.

Figure 2:
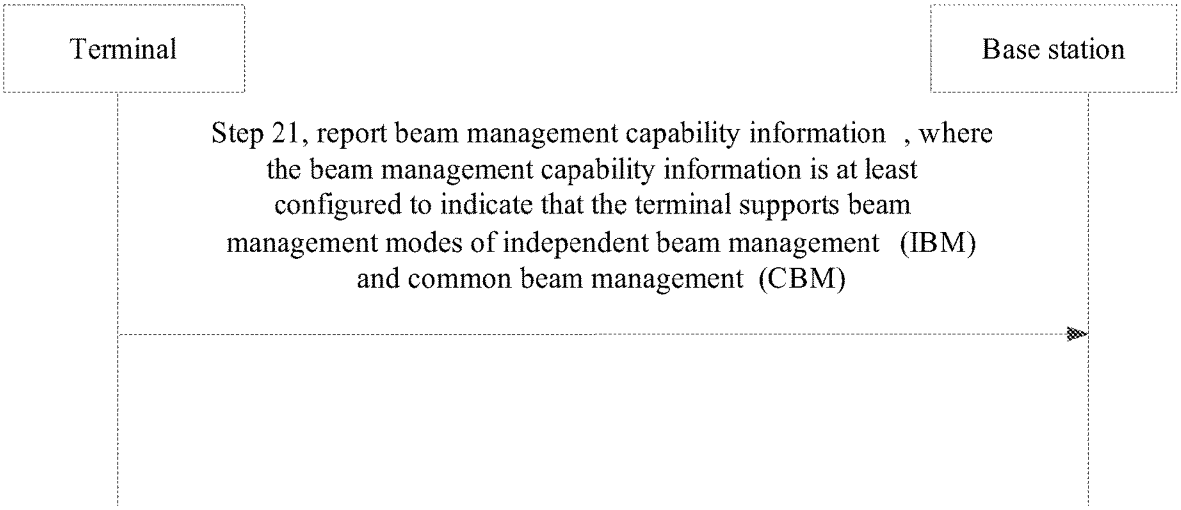
FIG. 2 is a schematic flow diagram of a method for reporting beam management capability information according to an example.

As shown in FIG. 2, a method for reporting beam management capability information is provided in an example. The method is performed by a terminal, and includes step 21.

In step 21, the terminal reports the beam management capability information. Where the beam management capability information is at least configured to indicate that the terminal supports beam management modes, including at least one of IBM or CBM.

Here, the terminal may be, but is not limited to, a mobile phone, a tablet computer, a wearable device, a vehicle-mounted terminal, a road side unit (RSU), a smart home terminal, an industrial sensing device, and/or a medical device. For example, the smart home terminal may include a camera, a temperature collection device, and a brightness collection device.

Here, a base station involved in the disclosure may be various types of base stations, for example, a base station of a third-generation mobile communication (3G) network, a base station of a 4G network, a base station of a 5G network, or other evolved base stations.

In an example, beam management capability information is reported, where the beam management capability information is at least configured to indicate that a terminal supports beam management modes of both IBM and CBM.

In an example, in response to a terminal determining that the terminal supports beam management modes of IBM and CBM, beam management capability information is reported to a base station. The beam management capability information is at least configured to indicate that the terminal supports beam management modes of IBM and CBM. It should be noted that if the terminal determines that the terminal may not support the beam management modes of both the IBM and the CBM, then the terminal determines that the terminal merely supports the beam management mode of the IBM or the CBM. Thus, the terminal reports the beam management capability information. The beam management capability information indicates that the terminal supports the beam management mode of the IBM or the CBM. Here, if the terminal merely supports the beam management mode of the IBM or the CBM, the base station may merely manage a beam on the basis of the beam management mode. If the terminal supports the beam management modes of both the IBM and the CBM, the base station may select one of the two beam management modes of the IBM and the CBM to manage the beam.

For example, a terminal may report beam management capability information to a base station via a plurality of signaling methods. For example, the terminal may report the beam management capability information to the base station by means of a first signaling and a second signaling. The first signaling carries indication information that the terminal supports the beam management mode of the IBM or the CBM; and the second signaling carries indication information that the terminal supports the beam management modes of the IBM and the CBM.

In an example, a terminal may send a first signaling and a second signaling to a base station. When the base station identifies the second signaling, the base station may skip the first signaling and determine a beam management mode configured on the basis of the second signaling after receiving the first signaling and the second signaling. The base station and/or the terminal manage/manages a beam on the basis of the beam management mode configured.

In an example, a terminal may merely send the first signaling to a base station without sending a second signaling. The base station may determine a beam management mode configured on the basis of the first signaling after receiving the first signaling. Certainly, even if the base station may not identify the second signaling, the terminal may still send the first signaling and the second signaling to the base station, but the base station skips the second signaling and determines the beam management mode configured on the basis of the first signaling after receiving the second signaling. The base station and/or the terminal manage/manages a beam on the basis of the beam management mode configured.

In an example, a terminal may send a first signaling and a second signaling to a base station. When the base station does not identify the second signaling, the base station may skip the second signaling and determine a beam management mode configured on the basis of the first signaling after receiving the first signaling and the second signaling.

In an example, a first signaling is supportedBandCombinationList-v1630. A second signaling is supportedBandCombinationList-v17xy. Here, indication information that a terminal supports IBM or CBM may be reported by means of beamManagementType-r16 in the first signaling. Indication information that the terminal supports the IBM and the CBM may be reported by means of beamManagementType-v17xy in the second signaling.

In the example of the disclosure, the beam management capability information is reported, where the beam management capability information is at least configured to indicate that the terminal supports the beam management modes of the IBM and the CBM. Here, when the terminal supports the beam management modes of both the IBM and the CBM, the terminal can send the beam management capability information indicating that the terminal supports both the IBM and the CBM to the base station. Compared with a mode of merely sending beam management capability information indicating that the terminal supports the IBM or the CBM to the base station, the base station can select one beam management mode from the IBM and the CBM to manage a beam after the terminal receives the beam management capability information, such that the beam is managed more flexibly.

It should be noted that those skilled in the art can understand that the method according to the example of the disclosure can be executed separately or together with some methods in the examples of the disclosure or related art.

Figure 3:
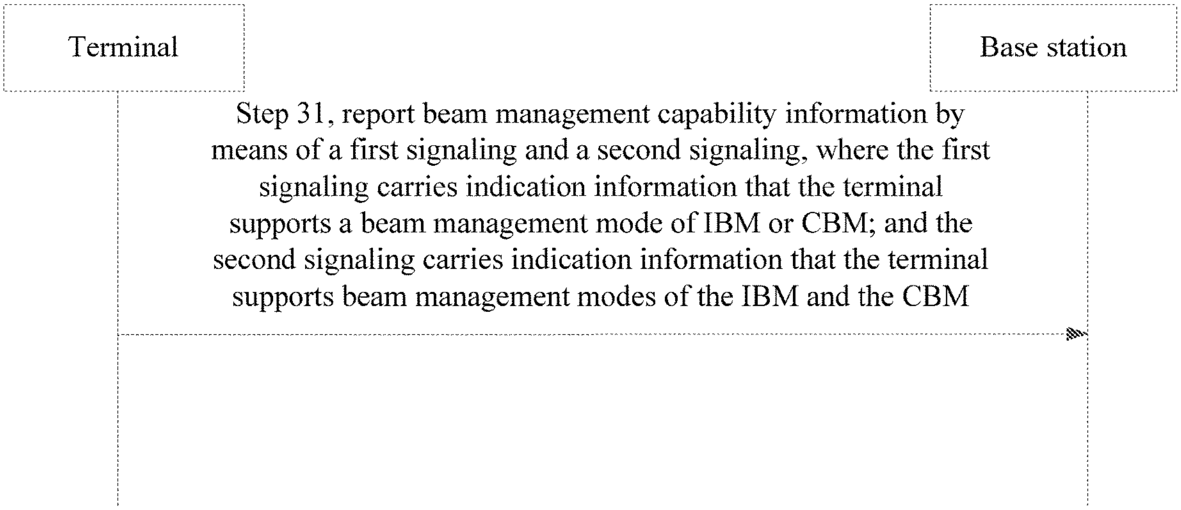
FIG. 3 is a schematic flow diagram of a method for reporting beam management capability information according to an example.

As shown in FIG. 3, a method for reporting beam management capability information is provided in an example. The method is performed by a terminal, and includes step 31.

In step 31, the terminal reports the beam management capability information by means of a first signaling and a second signaling. Where the first signaling carries indication information that the terminal supports a beam management mode of IBM or CBM; and the second signaling carries indication information that the terminal supports the beam management modes of the IBM and the CBM.

The second signaling may carry indication information that the terminal supports the beam management modes of both the IBM and the CBM.

In an example, a terminal reports beam management capability information by means of a first signaling and a second signaling. After receiving the beam management capability information reported by means of the first signaling and the second signaling, a base station may skip the first signaling and determine a beam management mode configured on the basis of the second signaling in response to determining that the base station may identify the second signaling. Alternatively, a base station may skip the second signaling and determine a beam management mode configured on the basis of the first signaling in response to determining that the base station may not identify the second signaling. The base station and/or the terminal manage/manages a beam on the basis of the beam management mode configured.

In an example, the second signaling includes a beamManagementType-v17xy signaling, where xy is a sequence number. It should be noted that the second signaling may further include at least one of the following signalings: a CA-ParametersNR-v17xy signaling, a BandCombination-v17xy signaling, a BandCombinationList-v17xy signaling, or a supportedBandCombinationList-v17xy signaling.

In an example, entries of the beamManagementType-v17xy signaling, the CA-ParametersNR-v17xy signaling, the BandCombination-v17xy signaling, the BandCombinationList-v17xy signaling and the supportedBandCombinationList-v17xy signaling are identical.

Here, identical entries may be the same entries. Here, the entries may include an entry identifier. The entry identifier is configured to indicate a plurality of signalings associated with each other. For example, the entry identifier of the entry (it should be noted that-v17xy may further be referred to as a suffix in a specific scenario) "-v17xy" of beamManagementType-v17xy is "xy". It should be noted that the suffix "-v17xy" is optional, and may be changed according to different releases. Here, xy is a sequence number, which is the same below and will not be repeated. For example, the NR CA parameters CA-ParametersNR-v17xy signaling, the band combination BandCombination-v17xy signaling, the band combination list BandCombinationList-v17xy signaling, and the supported band combination list supportedBandCombinationList-v17xy signaling included in the second signaling may all include "xy", and "xy" included in each signaling has the same value. For example, "xy" may be set as "10".

In an example, a beam management mode supported by a terminal may be reported by means of the following signaling:

```
RF-Parameters ::= SEQUENCE {
[[
  supportedBandCombinationList-v17xy      BandCombinationList-
                                           v17xy
OPTIONAL,
  ]],
}
/Here, supportedBandCombinationList-v17xy is a supported band
combination list signaling; and BandCombinationList-v17xy is a
band combination list signaling/
BandCombinationList-v17xy ::= SEQUENCE (SIZE (1..maxBand-
Comb)) OF BandCombination-v17xy
/Here, BandCombinationList-v17xy is a band combination list
signaling/
BandCombination-v17xy ::= SEQUENCE {
  ca-ParametersNR-v17xy CA-ParametersNR-v17xy OPTIONAL,
}
/Here, CA-ParametersNR-v17xy is a NR CA parameter signaling/
CA-ParametersNR-v17xy ::= SEQUENCE {
  -- R4 8-5: supported beam management type for inter-band CA
  beamManagementType-v17xy ENUMERATED {both}
OPTIONAL,
}
/Here, beamManagementType-v17xy is a beam management type
signaling/.
```

In an example, a first signaling is supportedBandCombinationList-v1630. A second signaling is supportedBandCombinationList-v17xy. Here, indication information that a terminal supports IBM or CBM may be reported by means of beamManagementType-r16 in the first signaling. Indication information that the terminal supports the IBM and the CBM may be reported by means of beamManagementType-v17x in the second signaling.

It should be noted that those skilled in the art can understand that the method according to the example of the disclosure can be executed separately or together with some methods in the examples of the disclosure or related art.

In an example, the second signaling includes a beamManagementType-v17xy signaling, where xy is a sequence number.

In an example, the second signaling may further include at least one of the following signalings: a r CA-ParametersNR-v17xy signaling, a BandCombination-v17xy signaling, a BandCombinationList-v17xy signaling, or a supportedBandCombinationList-v17xy signaling.

In an example, entries of the beamManagementType-v17xy signaling, the CA-ParametersNR-v17xy signaling, the BandCombination-v17xy signaling, the BandCombinationList-v17xy signaling and the supportedBandCombinationList-v17xy signaling are identical.

Figure 4:
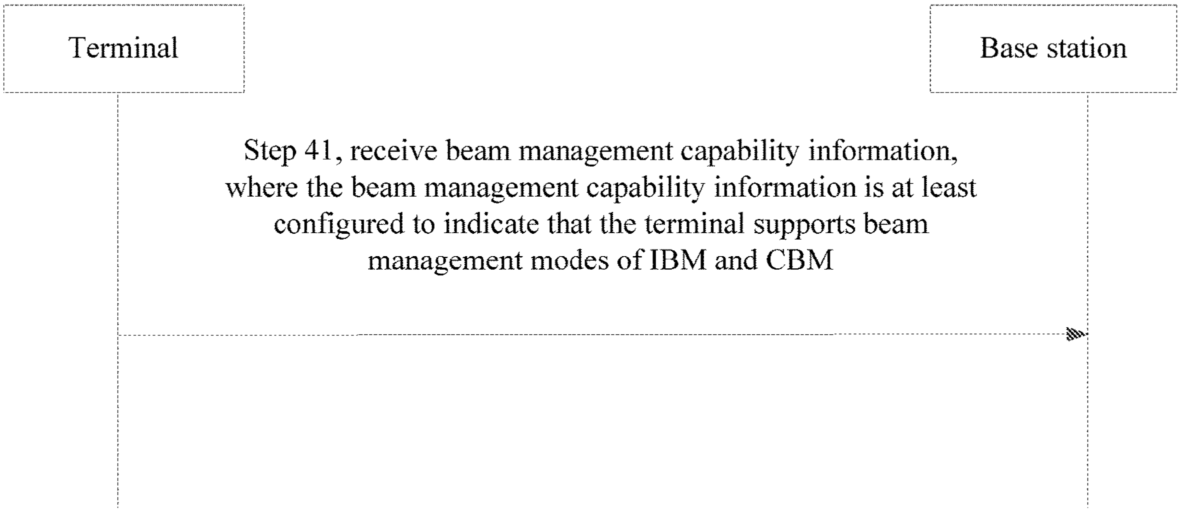
FIG. 4 is a schematic flow diagram of a method for reporting beam management capability information according to an example.

As shown in FIG. 4, a method for reporting beam management capability information is provided in an example. The method is performed by a base station, and includes step 41.

In step 41, the base station receives the beam management capability information, where the beam management capability information is at least configured to indicate that a terminal supports beam management modes including at least one of IBM or CBM.

Here, the terminal may be, but is not limited to, a mobile phone, a tablet computer, a wearable device, a vehicle-mounted terminal, an RSU, a smart home terminal, an industrial sensing device, and/or a medical device. For example, the smart home terminal may include a camera, a temperature collection device, and a brightness collection device.

Here, a base station involved in the disclosure may be various types of base stations, for example, a base station of a 3G network, a base station of a 4G network, a base station of a 5G network, or other evolved base stations.

In an example, beam management capability information is received, where the beam management capability information is at least configured to indicate that a terminal supports beam management modes of both IBM and CBM.

In an example, in response to a terminal determining that the terminal supports beam management modes of IBM and CBM, the terminal reports beam management capability information to a base station. The beam management capability information is at least configured to indicate that the terminal supports the beam management modes of the IBM and the CBM. It should be noted that if the terminal determines that the terminal may not support the beam management modes of both the IBM and the CBM, then the terminal determines that the terminal merely supports the beam management mode of the IBM or the CBM. Thus, the terminal reports the beam management capability information. The beam management capability information indicates that the terminal supports the beam management mode of the IBM or the CBM. The base station determines the beam management mode configured on the basis of the beam management capability information after receiving the beam management capability information. The base station and/or the terminal manage/manages a beam on the basis of the beam management mode configured. If the terminal merely supports the beam management mode of the IBM or the CBM, the base station may merely manage a beam on the basis of the beam management mode. If the terminal supports the beam management modes of both the IBM and the CBM, the base station may select one of the two beam management modes of the IBM and the CBM to manage the beam.

In an example, a terminal may report beam management capability information to a base station by means of a plurality of signalings. For example, the terminal may report the beam management capability information to the base station by means of a first signaling and a second signaling. The first signaling carries indication information that the terminal supports the beam management mode of the IBM or the CBM; and the second signaling carries indication information that the terminal supports the beam management modes of the IBM and the CBM. The base station receives the first signaling and the second signaling and determines the beam management mode configured on the basis of the beam management capability information indicated by the first signaling and/or the second signaling. It should be noted that when the terminal merely supports the beam management mode of the IBM, the base station determines the beam management mode configured as a beam management mode supporting the IBM. When the terminal merely supports the beam management mode of the CBM, the base station determines the beam management mode configured as a beam management mode supporting the CBM. When the terminal supports the beam management modes of both the IBM and the CBM, the base station may select one beam management mode from the CBM and the IBM to be determined as the beam management mode configured. The base station and/or the terminal manage/manages a beam on the basis of the beam management mode configured.

In an example, a terminal may send a first signaling and a second signaling to a base station. When the base station may identify the second signaling, the base station may skip the first signaling and determine a beam management mode configured on the basis of the second signaling after receiving the first signaling and the second signaling. The base station and/or the terminal manage/manages a beam on the basis of the beam management mode configured.

In an example, a terminal may merely send the first signaling to a base station without sending a second signaling. The base station may not identify the second signaling, and may determine a beam management mode configured on the basis of the first signaling after receiving the first signaling. Certainly, even if the base station may not identify the second signaling, the terminal may still send the first signaling and the second signaling to the base station, but the base station skips the second signaling and determines the beam management mode configured on the basis of the first signaling after receiving the second signaling. The base station and/or the terminal manage/manages a beam on the basis of the beam management mode configured.

In an example, a terminal may send a first signaling and a second signaling to a base station. When the base station may not identify the second signaling, the base station may skip the second signaling and determine a beam management mode configured on the basis of the first signaling after receiving the first signaling and the second signaling. The base station and/or the terminal manage/manages a beam on the basis of the beam management mode configured.

In an example, a first signaling is supportedBandCombinationList-v1630. A second signaling is supportedBandCombinationList-v17xy. Here, indication information that a terminal supports IBM or CBM may be reported by means of beamManagementType-r16 in the first signaling. Indication information that the terminal supports the IBM and the CBM may be reported by means of beamManagementType-v17xy in the second signaling.

It should be noted that those skilled in the art can understand that the method according to the example of the disclosure can be executed separately or together with some methods in the examples of the disclosure or related art.

Figure 5:
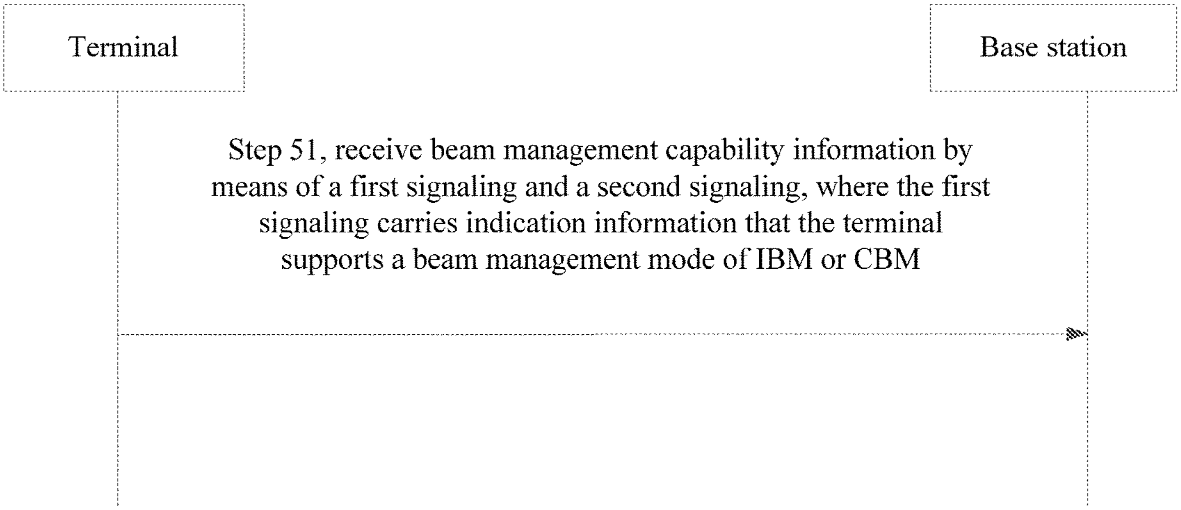
FIG. 5 is a schematic flow diagram of a method for reporting beam management capability information according to an example.

As shown in FIG. 5, a method for reporting beam management capability information is provided in an example. The method is performed by a base station and includes step 51.

In step 51, the base station receives the beam management capability information by means of a first signaling and a second signaling. Where the first signaling carries indication information that a terminal supports a beam management mode of IBM or CBM; and the second signaling carries indication information that the terminal supports the beam management modes of the IBM and the CBM.

The second signaling may carry indication information that the terminal supports the beam management modes of both the IBM and the CBM.

In an example, a terminal reports beam management capability information by means of a first signaling and a second signaling. After receiving the beam management capability information reported by means of the first signaling and the second signaling, a base station may skip the first signaling and determine a beam management mode configured on the basis of the second signaling in response to determining that the base station may identify the second signaling. Alternatively, after receiving the beam management capability information reported by means of the first signaling and the second signaling, a base station may skip the second signaling and determine a beam management mode configured on the basis of the first signaling in response to determining that the base station may not identify the second signaling. The base station and/or the terminal manage/manages a beam on the basis of the beam management mode configured.

In an example, the second signaling includes a beamManagementType-v17xy signaling, where xy is a sequence number. It should be noted that the second signaling may further include at least one of the following signalings: a CA-ParametersNR-v17xy signaling, a BandCombination-v17xy signaling, a BandCombinationList-v17xy signaling, or a supportedBandCombinationList-v17xy signaling.

In an example, entries of the beamManagementType-v17xy signaling, the CA-ParametersNR-v17xy signaling, the BandCombination-v17xy signaling, the BandCombinationList-v17xy signaling and the supportedBandCombinationList-v17xy signaling are identical.

Here, identical entries may be the same entries. Here, the entries may include an entry identifier. The entry identifier is configured to indicate a plurality of signalings associated with each other. For example, the entry identifier of the entry (it should be noted that-v17xy may further be referred to as a suffix in a specific scenario) "-v17xy" of beamManagementType-v17xy is "xy". It should be noted that the suffix "-v17xy" is optional, and may be changed according to different release. Here, xy is a sequence number, which is the same below and will not be repeated. For example, the CA-ParametersNR-v17xy signaling, the BandCombination-v17xy signaling, the BandCombinationList-v17xy signaling, and the supportedBandCombinationList-v17xy signaling included in the second signaling may all include "xy", and "xy" included in each signaling has the same value. For example, "xy" may be set as "10".

Here, for the specific implementation form of the signaling, reference may be made to the description in step 31.

In an example, a first signaling is supportedBandCombinationList-v1630. A second signaling is supportedBandCombinationList-v17xy. Here, indication information that a terminal supports IBM or CBM may be reported by means of beamManagementType-r16 in the first signaling. Indication information that the terminal supports the IBM and the CBM may be reported by means of beamManagementType-v17xy in the second signaling.

It should be noted that those skilled in the art can understand that the method according to the example of the disclosure can be executed separately or together with some methods in the examples of the disclosure or related art.

In an example, the second signaling includes a beamManagementType-v17xy signaling, where xy is a sequence number.

In an example, the second signaling may further include at least one of the following signalings: a CA-ParametersNR-v17xy signaling, a BandCombination-v17xy signaling, a BandCombinationList-v17xy signaling, or a supportedBandCombinationList-v17xy signaling.

In an example, entries of the beamManagementType-v17xy signaling, the CA-ParametersNR-v17xy signaling, the BandCombination-v17xy signaling, the BandCombinationList-v17xy signaling and the supportedBandCombinationList-v17xy signaling are identical.

Figure 6:
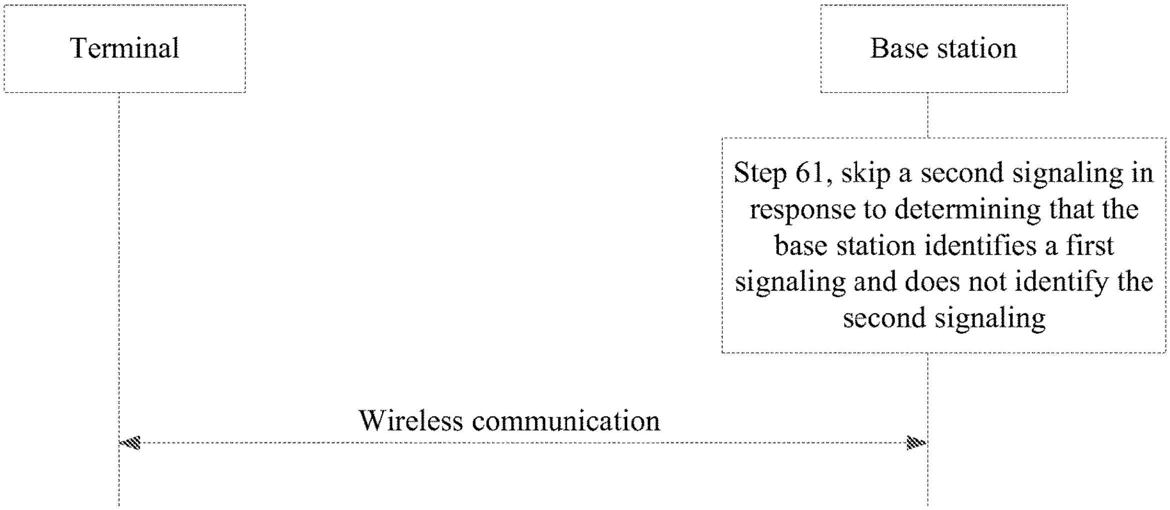
FIG. 6 is a schematic flow diagram of a method for reporting beam management capability information according to an example.

As shown in FIG. 6, a method for reporting beam management capability information is provided in an example. The method is performed by a base station, and includes step 61.

In step 61, the base station skips a second signaling in response to determining that the base station identifies a first signaling and does not identify the second signaling.

In an example, a first signaling is supportedBandCombinationList-v1630. A second signaling is supportedBandCombinationList-v17xy. Here, indication information that a terminal supports IBM or CBM may be reported by means of beamManagementType-r16 in the first signaling. Indication information that the terminal supports IBM and CBM may be reported by means of beamManagementType-v17xy in the second signaling.

In an example, beam management capability information is received by means of a first signaling and a second signaling, where the first signaling carries indication information that a terminal supports a beam management mode of IBM or CBM; and the second signaling carries indication information that the terminal supports beam management modes of the IBM and the CBM. In response to determining that the base station identifies the first signaling and does not identify the second signaling, the second signaling is skipped, and the beam management mode configured is determined on the basis of the first signaling. The base station and/or the terminal manage/manages a beam on the basis of the beam management mode configured.

It should be noted that those skilled in the art can understand that the method according to the example of the disclosure can be executed separately or together with some methods in the examples of the disclosure or related art.

Figure 7:
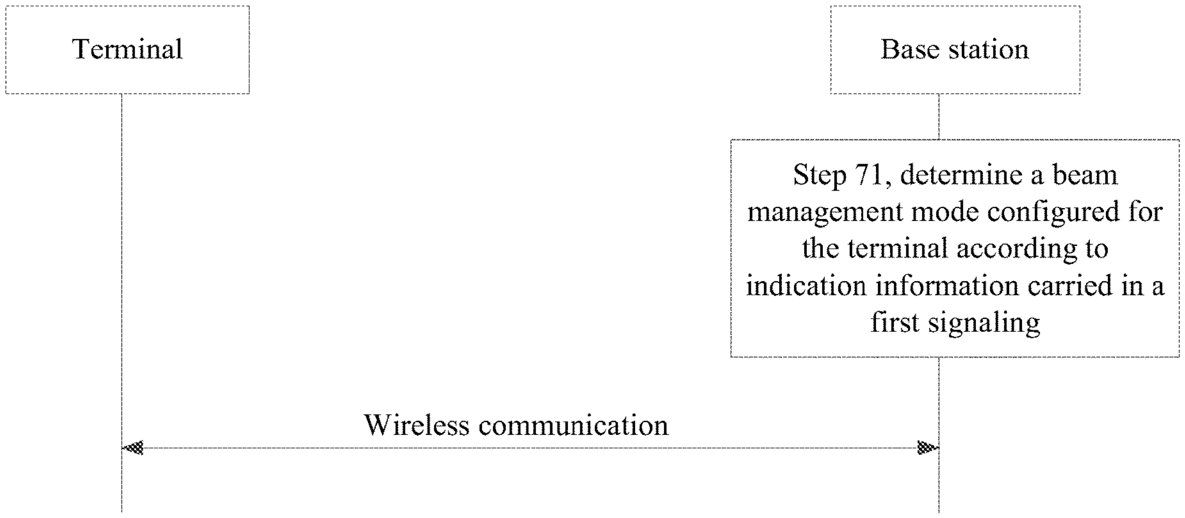
FIG. 7 is a schematic flow diagram of a method for reporting beam management capability information according to an example.

As shown in FIG. 7, a method for reporting beam management capability information is provided in an example. The method is performed by a base station, and includes step 71.

In step 71, the base station determines a beam management mode configured for a terminal according to indication information carried in a first signaling.

In an example, beam management capability information is received by means of a first signaling and a second signaling. Where the first signaling carries indication information that a terminal supports a beam management mode of IBM or CBM; and the second signaling carries indication information that the terminal supports beam management modes of the IBM and the CBM. In response to determining that the base station identifies the first signaling and does not identify the second signaling, the second signaling is skipped, and the beam management mode configured is determined on the basis of the first signaling. The base station and/or the terminal manage/manages a beam on the basis of the beam management mode configured.

It should be noted that those skilled in the art can understand that the method according to the example of the disclosure can be executed separately or together with some methods in the examples of the disclosure or related art.

Figure 8:
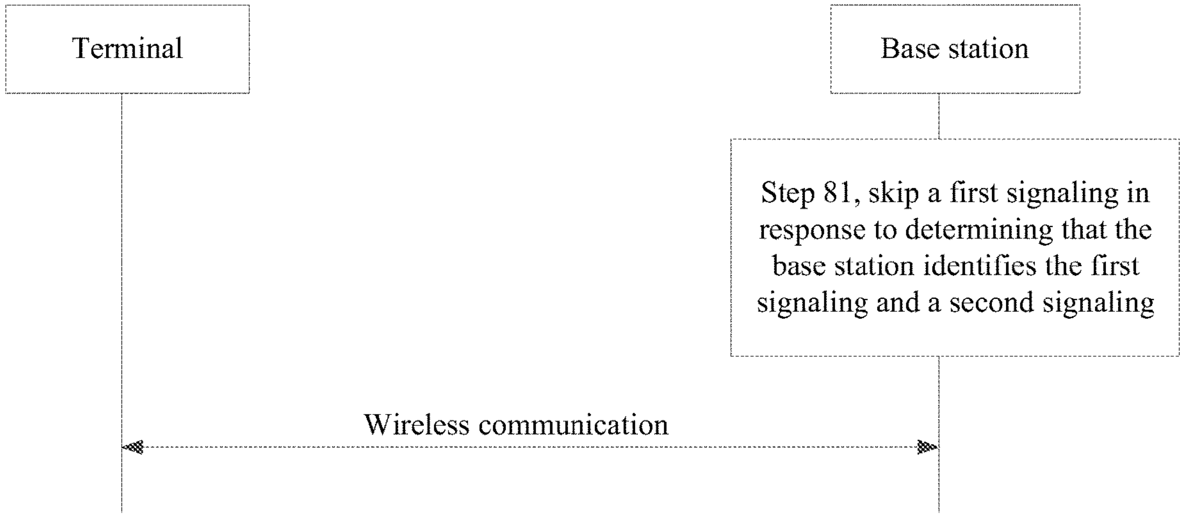
FIG. 8 is a schematic flow diagram of a method for reporting beam management capability information according to an example.

As shown in FIG. 8, a method for reporting beam management capability information is provided in an example. The method is performed by a base station, and includes step 81.

In step 81, the base station skips a first signaling in response to determining that the base station identifies a first signaling and a second signaling.

In an example, a first signaling is supportedBandCombinationList-v1630. A second signaling is supportedBandCombinationList-v17xy. Here, indication information that a terminal supports IBM or CBM may be reported by means of beamManagementType-r16 in the first signaling. Indication information that the terminal supports the IBM and the CBM may be reported by means of beamManagementType-v17xy in the second signaling.

In an example, beam management capability information is received by means of a first signaling and a second signaling. Where the first signaling carries indication information that a terminal supports a beam management mode of IBM or CBM; and the second signaling carries indication information that the terminal supports beam management modes of the IBM and the CBM. In response to determining that the base station identifies the first signaling and the second signaling, the first signaling is skipped, and the beam management mode configured is determined on the basis of the second signaling. The base station and/or the terminal manage/manages a beam on the basis of the beam management mode configured.

It should be noted that those skilled in the art can understand that the method according to the example of the disclosure can be executed separately or together with some methods in the examples of the disclosure or related art.

Figure 9:
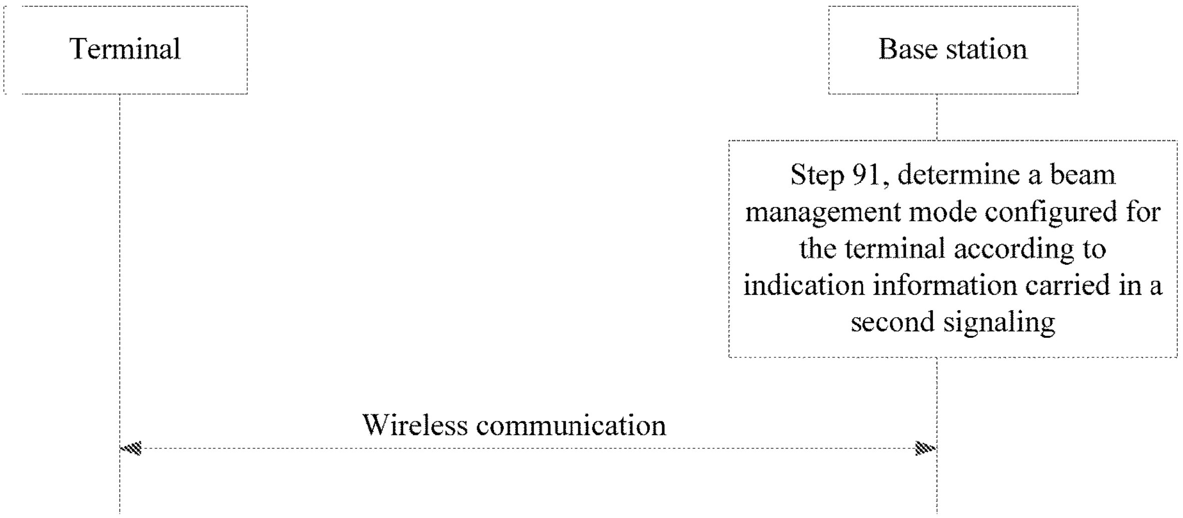
FIG. 9 is a schematic flow diagram of a method for reporting beam management capability information according to an example.

As shown in FIG. 9, a method for reporting beam management capability information is provided in an example. The method is performed by a base station, and includes step 91.

In step 91, the base station determines a beam management mode configured for a terminal according to indication information carried in a second signaling.

In an example, beam management capability information is received by means of a first signaling and a second signaling. Where the first signaling carries indication information that a terminal supports a beam management mode of IBM or CBM; and the second signaling carries indication information that the terminal supports beam management modes of the IBM and the CBM. In response to determining that the base station identifies the first signaling and the second signaling, the first signaling is skipped, and the beam management mode configured is determined on the basis of the second signaling. The base station and/or the terminal manage/manages a beam on the basis of the beam management mode configured.

It should be noted that those skilled in the art can understand that the method according to the example of the disclosure can be executed separately or together with some methods in the examples of the disclosure or related art.

Figure 10:
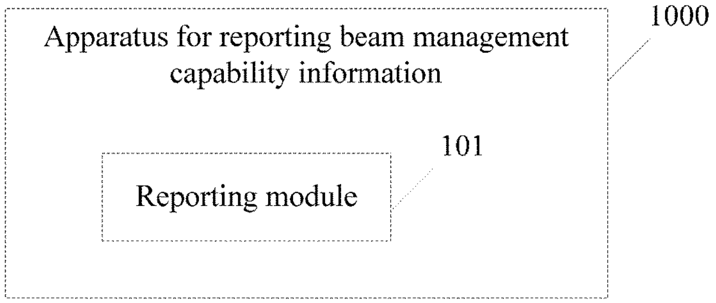
FIG. 10 is a schematic diagram of an apparatus for reporting beam management capability information according to an example.

As shown in FIG. 10, an apparatus for reporting beam management capability information 1000 is provided in an example. The apparatus for reporting beam management capability information 1000 includes a reporting module 101.

The reporting module 101 is configured to report the beam management capability information. Where the beam management capability information is at least configured to indicate that a terminal supports beam management modes, including at least one of IBM or CBM.

In an example, the reporting module 101 is further configured to report the beam management capability information by means of a first signaling and a second signaling, where the first signaling carries indication information that the terminal supports a beam management mode of the IBM or the CBM; and the second signaling carries indication information that the terminal supports the beam management modes of the IBM and the CBM.

It should be noted that those skilled in the art can understand that the method according to the example of the disclosure can be executed separately or together with some methods in the examples of the disclosure or related art.

Figure 11:
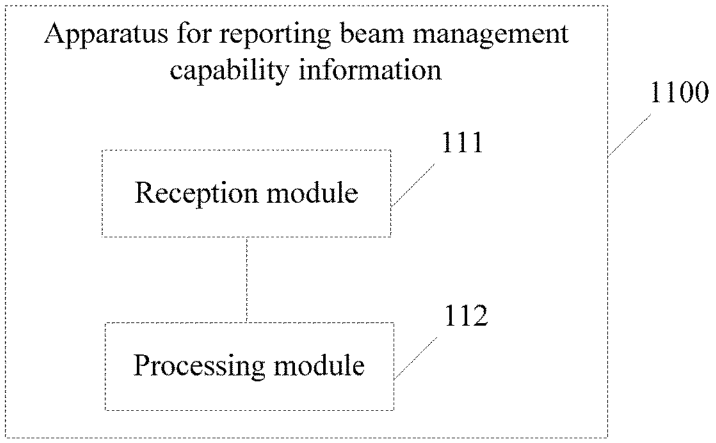
FIG. 11 is a schematic diagram of an apparatus for reporting beam management capability information according to an example.

As shown in FIG. 11, an apparatus for reporting beam management capability information 1100 is provided in an example. The apparatus for reporting beam management capability information 1100 includes a reception module 111 and a processing module 112.

The reception module 111 is configured to receive the beam management capability information. Where the beam management capability information is at least configured to indicate that a terminal supports beam management modes, including at least one of IBM or CBM.

In an example, the reception module 111 is further configured to receive the beam management capability information by means of a first signaling and a second signaling. Where the first signaling carries indication information that the terminal supports a beam management mode of the IBM or the CBM; and the second signaling carries indication information that the terminal supports the beam management modes of the IBM and the CBM.

The processing module 112 is configured to skip the second signaling in response to determining that a base station identifies the first signaling and does not identify the second signaling.

In an example, the processing module 112 is further configured to determine a beam management mode configured for the terminal according to the indication information carried in the first signaling.

In an example, the processing module 112 is configured to skip the first signaling in response to determining that a base station identifies the first signaling and the second signaling.

In an example, the processing module 112 is further configured to determine a beam management mode configured for the terminal according to the indication information carried in the second signaling.

It should be noted that those skilled in the art can understand that the method according to the example of the disclosure can be executed separately or together with some methods in the examples of the disclosure or related art.

A communication device is provided in an example of the disclosure. The communication device includes: a processor; and a memory configured to store a processor-executable instruction. Where the processor is configured to implement the method applied to any example of the disclosure when running the executable instruction.

The processor may include various types of storage media. The storage media are non-temporary computer storage media that can continue to store information on the communication device after power failure.

The processor may be connected to the memory by means of a bus, and is configured to read an executable program stored in the memory.

A non-transitory computer-readable storage medium is further provided in an example of the disclosure. The non-transitory computer-readable storage medium stores a computer-executable program, and the executable program implements the method of any example of the disclosure when executed by a processor.

For the apparatuses in the examples provided herein, a specific mode for each module to execute an operation has been described in detail in the example relating to the method, which will not be repeated here. Additionally, the apparatuses may include the structural features of the communication device, such as a processor and memory, any of the features of the terminal 800 described in detail herein, and/or any of the features of the base station 900 described in detail herein.

Figure 12:
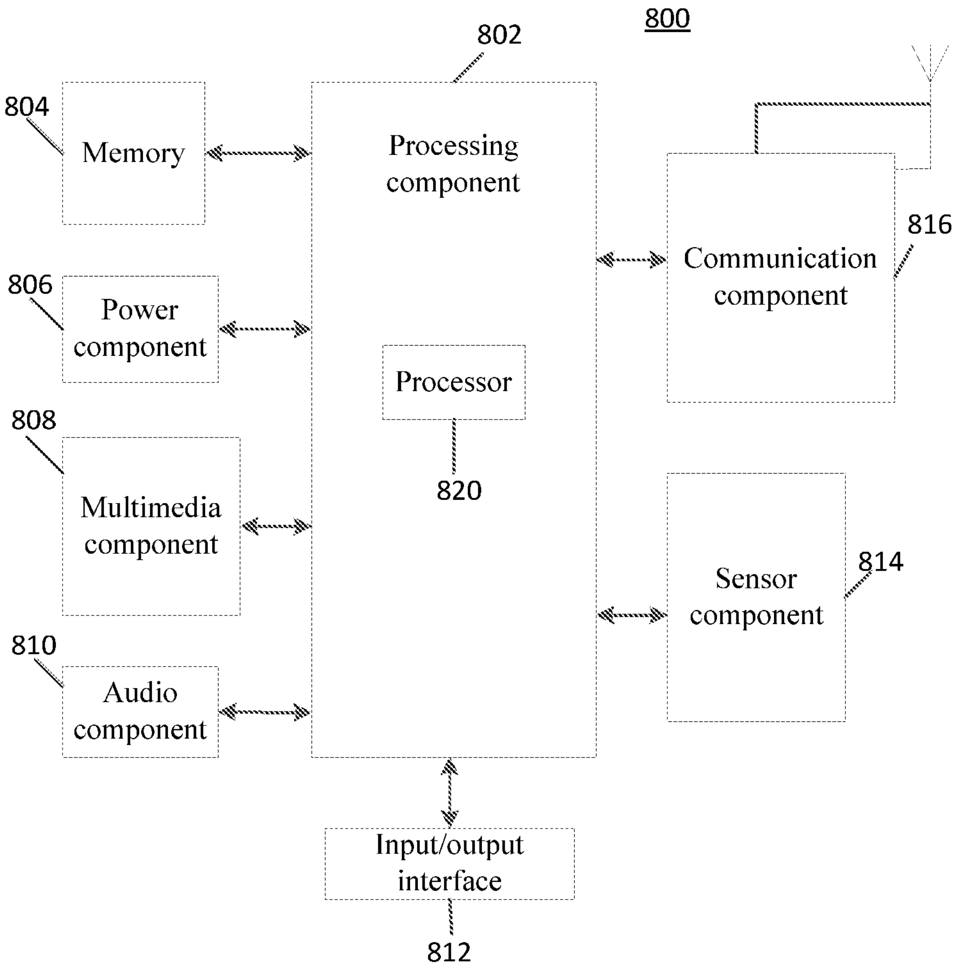
FIG. 12 is a schematic structural diagram of a terminal according to an example.

As shown in FIG. 12, a structure of a terminal 800 is provided in an example of the disclosure.

With reference to the terminal 800 shown in FIG. 12, the terminal 800 is provided in the example. The terminal 800 may be a mobile phone, a computer, a digital broadcast terminal, a message sending and receiving device, a game console, a tablet device, a medical device, a fitness device, a personal digital assistant, etc.

With reference to FIG. 12, the terminal 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls overall operations of the terminal 800, such as operations associated with display, phone calls, data communications, camera operations, and recording operations. The processing component 802 may include one or more processors 820 to execute an instruction to complete all or some of the steps of the method described above. Further, the processing component 802 may include one or more modules that facilitate interaction between the processing component 802 and other components. For example, the processing component 802 may include a multimedia module, so as to facilitate interaction between the multimedia component 808 and the processing component 802.

The memory 804 is configured to store various types of data to support operations at the terminal 800. Examples of such data include instructions, contact data, phone book data, messages, pictures, videos, etc., for any application or method operated on the terminal 800. The memory 804 may be implemented by any type of volatile or non-volatile storage device, or a combination of any type of volatile or non-volatile storage device, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power supply component 806 provides power for various components of the terminal 800. The power supply component 806 may include a power management system, one or more power supplies, and other components associated with generation, management and distribution of power for the terminal 800.

The multimedia component 808 includes a screen that provides an output interface between the terminal 800 and a user. In some examples, the screen may include a liquid crystal display (LCD) and a touch panel (TP). If the screen includes the TP, the screen may be implemented as a touch screen to receive an input signal from a user. The touch panel includes one or more touch sensors to sense touches, swipes, and gestures on the TP. The touch sensor may not only sense a boundary of a touch or swiping action, but also detect duration and pressure associated with the touch or swiping operation. In some examples, the multimedia component 808 includes a front camera and/or a rear camera. When the terminal 800 is in an operation mode, such as a photographing mode or a video mode, the front camera and/or the rear camera may receive external multimedia data. Each front camera and each rear camera may be a fixed optical lens system or have a focal length and an optical zoom capability.

The audio component 810 is configured to output and/or input an audio signal. For example, the audio component 810 includes a microphone (MIC). The MIC is configured to receive an external audio signal when the terminal 800 is in the operation mode, such as a call mode, a recording mode, and a voice recognition mode. The received audio signal may be further stored in the memory 804 or sent via the communication component 816. In some examples, the audio component 810 further includes a loudspeaker configured to output an audio signal.

The I/O interface 812 provides an interface between the processing component 802 and a peripheral interface module. The peripheral interface module described above may be a keyboard, a click wheel, a button, etc. The button may include, but IS not limited to, a home button, a volume button, a start button, and a lock button.

The sensor component 814 includes one or more sensors, configured to provide state assessments of various aspects for the terminal 800. For example, the sensor component 814 may detect an open/closed state of the terminal 800 and a relative positioning effect of components. For example, the component is a display and a keypad of the terminal 800. The sensor component 814 may further detect a change in position of the terminal 800 or a component of the terminal 800, the presence or absence of the user making contact with the terminal 800, the orientation or acceleration/deceleration of the terminal 800, and a change in temperature of the terminal 800. The sensor component 814 may include a proximity sensor configured to detect the presence of nearby objects in the absence of any physical contact. The sensor component 814 may further include a light sensor, such as a complementary metal-oxide-semiconductor (CMOS) image sensor or a charge coupled device (CCD) image sensor, used in imaging applications. In some examples, the sensor component 814 may further include an acceleration sensor, a gyro sensor, a magnetic sensor, a pressure sensor, or a temperature sensor.

The communication component 816 is configured to facilitate communication between the terminal 800 and other devices in a wired or wireless manner. The terminal 800 may access a wireless network based on a communication standard, such as wireless fidelity (WiFi), second generation mobile communication (2G) and 3G, or their combination. In an example, the communication component 816 receives a broadcast signal or broadcast-related information from an external broadcast management system via a broadcast channel. In an example, the communication component 816 further includes a near field communication (NFC) module to facilitate short range communication. For example, the NFC module may be implemented on the basis of a radio frequency identification (RFID) technology, an infrared data association (IrDA) technology, an ultra wide band (UWB) technology, a Bluetooth (BT) technology, and other technologies.

In an example, the terminal 800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, micro-processors, or other electronic elements, and is configured to execute the methods described above.

In an example, a non-transitory computer-readable storage medium including an instruction is further provided, such as a memory 804 including an instruction. The instruction is executable by a processor 820 of the terminal 800, so as to complete the method. For example, the non-transitory computer-readable storage medium may be a read only memory (ROM), a random access memory (RAM), a compact disc read-only memory (CD-ROM), a magnetic tape, a floppy disk, an optical data storage device, etc.

Figure 13:
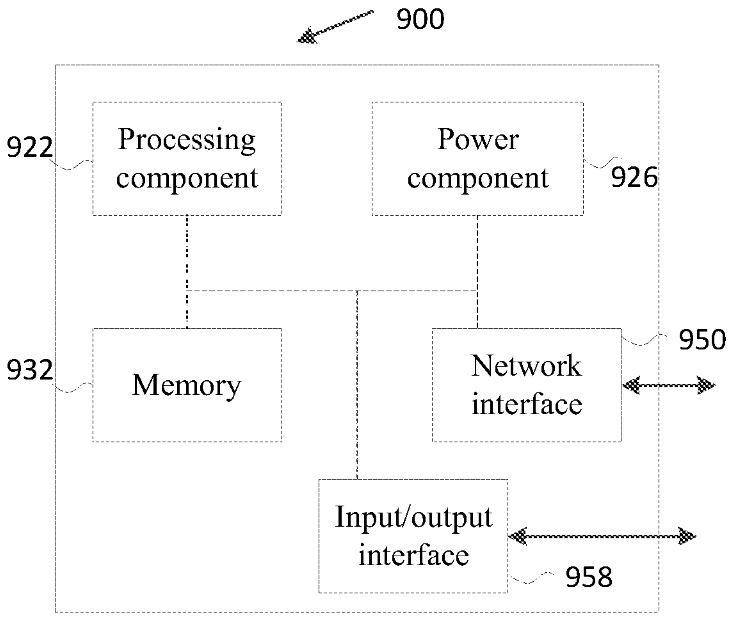
FIG. 13 is a block diagram of a base station according to an example.

As shown in FIG. 13, a structure of a base station 900 is shown in an example of the disclosure. For example, a base station 900 may be provided as a network-side device. With reference to FIG. 13, the base station 900 includes a processing component 922. The processing component further includes one or more processors (not shown), and memory resources that are represented by a memory 932 and configured to store an instruction executable by a processing component 922, e.g., an application. The application stored in the memory 932 may include one or more modules, each of which corresponds to a set of instructions. Further, the processing component 922 is configured to execute the instruction to execute any of the methods described above as previously applied to the base station.

The base station 900 may further include a power supply component 926 configured to execute power management for the base station 900, a wired or wireless network interface 950 configured to connect the base station 900 to a network, and an input/output (I/O) interface 958. The base station 900 may operate on an operating system stored in the memory 932, such as Windows Server™, Mac OS X™, Unix™, Linux™, FreeBSD™, or the like.

According to a first aspect of examples of the disclosure, a method for reporting beam management capability information is provided. The method is performed by a terminal, and includes: reporting the beam management capability information, where the beam management capability information is at least configured to indicate that the terminal supports beam management modes including at least one of independent beam management (IBM) or common beam management (CBM).

In an example, the reporting the beam management capability information includes: reporting the beam management capability information by means of a first signaling and a second signaling, where the first signaling carries indication information that the terminal supports a beam management mode of the IBM or the CBM; and the second signaling carries indication information that the terminal supports the beam management modes of the IBM and the CBM.

In an example, the second signaling includes a beamManagementType-v17xy signaling, where xy is a sequence number.

In an example, the second signaling further includes at least one of the following signalings: a CA-ParametersNR-v17xy signaling, a BandCombination-v17xy signaling, a BandCombinationList-v17xy signaling, or a supportedBandCombinationList-v17xy signaling.

In an example, entries of the beamManagementType-v17xy signaling, the CA-ParametersNR-v17xy signaling, the BandCombination-v17xy signaling, the BandCombinationList-v17xy signaling and the supportedBandCombinationList-v17xy signaling are identical.

According to a second aspect of an example of the disclosure, a method for reporting beam management capability information is provided. The method is performed by a base station, and includes: receiving the beam management capability information, where the beam management capability information is at least configured to indicate that a terminal supports beam management modes of IBM and CBM.

In an example, receiving the beam management capability information includes: receiving the beam management capability information by means of a first signaling and a second signaling, where the first signaling carries indication information that the terminal supports a beam management mode of the IBM or the CBM; and the second signaling carries indication information that the terminal supports the beam management modes including at least one of the IBM or the CBM.

In an example, the second signaling includes a beamManagementType-v17xy signaling, where xy is a sequence number.

In an example, the second signaling further includes at least one of the following signalings: a CA-ParametersNR-v17xy signaling, a BandCombination-v17xy signaling, a BandCombinationList-v17xy signaling, or a supportedBandCombinationList-v17xy signaling.

In an example, entries of the beamManagementType-v17xy signaling, the CA-ParametersNR-v17xy signaling, the BandCombinationList-v17xy signaling, the BandCombinationList-v17xy signaling and the supportedBandCombinationList-v17xy signaling are identical.

In an example, the method further includes: skipping the second signaling in response to determining that the base station identifies the first signaling and does not identify the second signaling.

In an example, the method further includes: determining a beam management mode configured for the terminal according to the indication information carried in the first signaling.

In an example, the method further includes: skipping the first signaling in response to determining that the base station identifies the first signaling and the second signaling.

In an example, the method further includes: determining a beam management mode configured for the terminal according to the indication information carried in the second signaling.

According to a third aspect of an example of the disclosure, an apparatus for reporting beam management capability information is provided. The apparatus includes: a reporting module, configured to report the beam management capability information, where the beam management capability information is at least configured to indicate that a terminal supports beam management modes including at least one of IBM or CBM.

In an example, the reporting module is further configured to report the beam management capability information by means of a first signaling and a second signaling, where the first signaling carries indication information that the terminal supports a beam management mode of the IBM or the CBM; and the second signaling carries indication information that the terminal supports the beam management modes of the IBM and the CBM.

According to a fourth aspect of an example of the disclosure, an apparatus for reporting beam management capability information is provided. The apparatus includes: a reception module, configured to receive the beam management capability information, where the beam management capability information is at least configured to indicate that a terminal supports beam management modes including at least one of IBM or CBM.

In an example, the reception module is further configured to: receive the beam management capability information by means of a first signaling and a second signaling, where the first signaling carries indication information that the terminal supports a beam management mode of the IBM or the CBM; and the second signaling carries indication information that the terminal supports the beam management modes of the IBM and the CBM.

In an example, the apparatus further includes: a processing module, configured to skip the second signaling in response to determining that a base station identifies the first signaling and does not identify the second signaling.

In an example, the processing module is further configured to: determine a beam management mode configured for the terminal according to the indication information carried in the first signaling.

In an example, the apparatus further includes: a processing module, configured to skip the first signaling in response to determining that a base station identifies the first signaling and the second signaling.

In an example, the processing module is further configured to: determine a beam management mode configured for the terminal according to the indication information carried in the second signaling.

In the example of the disclosure, the beam management capability information is reported, where the beam management capability information is at least configured to indicate that the terminal supports the beam management modes of the IBM and the CBM. Herein, when the terminal supports the beam management modes of both the IBM and the CBM, the terminal can send the beam management capability information indicating that the terminal supports both the IBM and the CBM to the base station. Compared with a mode of merely sending beam management capability information indicating that the terminal supports the IBM or the CBM to the base station, the base station can select one beam management mode from the IBM and the CBM to manage a beam after the terminal receives the beam management capability information, such that the beam is managed more flexibly.

Those skilled in the art can easily conceive of other implementation solutions of the disclosure upon consideration of the description and the invention disclosed in the implementation. The disclosure is intended to cover any variations, uses or adaptive changes of the disclosure, which follow the general principles of the disclosure and include common general knowledge or customary technical means, which is not disclosed in the disclosure, in the technical field. The description and the examples are to be regarded as illustrative merely, and the true scope and spirit of the disclosure are indicated by the appended claims. It should be understood that the disclosure is not limited to a precise structure which has been described above and illustrated in the accompanying drawings, and can have various modifications and changes without departing from the scope of the disclosure. The scope of the disclosure is limited by the appended claims merely.

The invention claimed is:

1. A method for reporting beam management capability information, wherein the method is performed by a terminal, and comprises:

reporting the beam management capability information, wherein the beam management capability information is at least configured to indicate that the terminal supports beam management modes including at least one of independent beam management (IBM) or common beam management (CBM), wherein reporting the beam management capability information comprises:

reporting the beam management capability information by means of a first signaling and a second signaling, wherein the first signaling carries indication information that the terminal supports a beam management mode of the IBM or the CBM, and the second signaling carries indication information that the terminal supports the beam management modes of the IBM and the CBM, wherein the second signaling comprises at least one of:

a CA-ParametersNR-v17xy signaling, a BandCombination-v17xy signaling, a BandCombinationList-v17xy signaling, or a supportedBandCombinationList-v17xy signaling, wherein xy is a sequence number.

2. The method according to claim 1, wherein the second signaling further comprises a beamManagementType-v17xy signaling.

3. The method according to claim 2, wherein entries of the beamManagementType-v17xy signaling, the CA-ParametersNR-v17xy signaling, the BandCombination-v17xy signaling, the BandCombinationList-v17xy signaling and the supportedBandCombinationList-v17xy signaling are identical.

4. A non-transitory computer readable storage medium, storing a computer-executable instruction, wherein the computer-executable instruction, when executed by a processor, causes the processor to execute the method according to claim 1.

5. A method for reporting beam management capability information, wherein the method is performed by a base station, and comprises:

receiving the beam management capability information, wherein the beam management capability information is at least configured to indicate that a terminal supports beam management modes of at least one of independent beam management (IBM) or common beam management (CBM), wherein receiving the beam management capability information comprises:

receiving the beam management capability information by means of a first signaling and a second signaling, wherein the first signaling carries indication information that the terminal supports a beam management mode of the IBM or the CBM, and the second signaling carries indication information that the terminal supports the beam management modes of the IBM and the CBM, wherein the second signaling comprises at least one of:

a CA-parametersNR-v17xy signaling, a BandCombination-v17xy signaling, a BandCombinationList-v17xy signaling, or a supportedBandCombinationList-v17xy signaling, wherein xy is a sequence number.

6. The method according to claim 5, wherein the second signaling further comprises a beamManagementType-v17xy signaling.

7. The method according to claim 6, wherein entries of the beamManagementType-v17xy signaling, the CA-ParametersNR-v17xy signaling, the BandCombination-v17xy signaling, the BandCombinationList-v17xy signaling and the supportedBandCombinationList-v17xy signaling are identical.

8. The method according to claim 5, further comprising:

skipping the second signaling on a condition that the base station identifies the first signaling and does not identify the second signaling.

9. The method according to claim 8, further comprising:

determining a beam management mode configured for the terminal according to the indication information carried in the first signaling.

10. The method according to claim 5, further comprising:

skipping the first signaling on a condition that the base station identifies the first signaling and the second signaling.

11. The method according to claim 10, further comprising:

determining a beam management mode configured for the terminal according to the indication information carried in the second signaling.

12. A communication device, comprising:

a memory; and a processor communicatively coupled to the memory, wherein the processor is configured to implement the method according to claim 5.

13. A terminal, comprising:

a memory; and a processor communicatively coupled to the memory, and the processor is configured to:

report the beam management capability information, wherein the beam management capability information is at least configured to indicate that the terminal supports beam management modes including at least one of independent beam management (IBM) or common beam management (CBM), wherein the processor is further configured to:

report the beam management capability information by means of a first signaling and a second signaling, wherein the first signaling carries indication information that the terminal supports a beam management mode of the IBM or the CBM, and the second signaling carries indication information that the terminal supports the beam management modes of the IBM and the CBM, wherein the second signaling comprises at least one of:

a CA-ParametersNR-v17xy signaling, a BandCombination-v17xy signaling, a BandCombinationList-v17xy signaling, or a supportedBandCombinationList-v17xy signaling, wherein xy is a sequence number.

14. The terminal according to claim 13, wherein the second signaling further comprises a beamManagement-Type-v17xy signaling.

* * * * *